United States Patent
Kato

(10) Patent No.: US 6,843,275 B2
(45) Date of Patent: Jan. 18, 2005

(54) HIGH-PRESSURE FUEL INJECTION PIPE

(75) Inventor: Nobuo Kato, Susono (JP)

(73) Assignee: Usui Kokusai Sangyo Kaisha Limited (JP)

( * ) Notice: Subject to any disclaimer, the term of this patent is extended or adjusted under 35 U.S.C. 154(b) by 0 days.

(21) Appl. No.: 10/858,731

(22) Filed: Jun. 2, 2004

(65) Prior Publication Data
US 2004/0256014 A1 Dec. 23, 2004

(30) Foreign Application Priority Data
Jun. 20, 2003 (JP) ..................... 2003-177347

(51) Int. Cl.[7] ................. F16L 9/00
(52) U.S. Cl. ............. 138/109; 123/468; 72/370.11; 285/386
(58) Field of Search ............... 138/109, 155, 138/177, DIG. 11; 285/386; 123/468; 72/370.11

(56) References Cited

U.S. PATENT DOCUMENTS

| 4,832,376 A | 5/1989 | Sugao |
| 4,893,601 A | 1/1990 | Sugao |
| 4,900,180 A | 2/1990 | Takikawa |
| 5,109,888 A | * 5/1992 | Usui ............ 138/109 |
| 5,120,084 A | 6/1992 | Hashimoto |
| 5,143,410 A | 9/1992 | Takikawa |
| 5,169,182 A | 12/1992 | Hashimoto |
| 5,172,939 A | 12/1992 | Hashimoto |
| 5,667,255 A | 9/1997 | Kato |
| 5,887,910 A | 3/1999 | Usui |
| 5,903,964 A | 5/1999 | Uematsu et al. |
| 5,957,507 A | 9/1999 | Asada |
| 5,979,945 A | 11/1999 | Hitachi et al. |
| 5,992,904 A | 11/1999 | Hitachi et al. |
| 6,050,611 A | 4/2000 | Asada |
| 6,070,618 A | 6/2000 | Iwabuchi |
| 6,126,208 A | 10/2000 | Asada et al. |
| 6,397,881 B1 | 6/2002 | Asada et al. |
| 6,408,826 B2 | 6/2002 | Asada et al. |
| 6,415,768 B1 | 7/2002 | Usui |
| 6,463,909 B2 | 10/2002 | Asada et al. |
| 6,494,183 B2 | 12/2002 | Usui et al. |
| 6,595,558 B2 | * 7/2003 | Kusanagi ............ 285/382 |
| 2004/0135368 A1 | * 7/2004 | Furugen ............ 285/259 |

FOREIGN PATENT DOCUMENTS

| JP | 2-80289 | 3/1990 |
| JP | 3-177693 | 8/1991 |
| JP | 4-175462 | 6/1992 |

* cited by examiner

Primary Examiner—James Hook
(74) Attorney, Agent, or Firm—Gerald E. Hespos; Anthony J. Casella

(57) ABSTRACT

A high-pressure fuel injection pipe has a connecting head portion increased in diameter by buckling molding at the end of a thick and small-diameter metallic pipe. An under-head portion of the connecting head is formed with a thick wall portion that satisfies conditions of: a radius of curvature R1 of a portion A of the thick wall portion continuing to the connecting head is 0.03 to 0.15 times the outer diameter of the pipe; a radius of curvature R2 of a portion B continuing from the portion A of the thick wall portion to a straight pipe portion is 0.3 to 1.5 times the outer diameter of the pipe; and a maximum diametrical size w of the thick wall portion is 0.25 to 0.4 times a maximum diametrical projecting length W of the connecting head.

8 Claims, 4 Drawing Sheets

PRIOR ART

HIGH-PRESSURE FUEL INJECTION PIPE

BACKGROUND OF THE INVENTION

1. Technical Field

The present invention relates to a high-pressure fuel injection pipe generally provided and used as a fuel supply channel in a diesel internal combustion engine and formed of a relatively thick and small-diameter metallic pipe and, more specifically, to a high-pressure fuel injection pipe which can alleviate concentration of a stress to an under-head portion at the terminal due to a bending load or the like caused by vibrations.

2. Background Art

In the background art, there is a known high-pressure fuel injection pipe of this type formed of a thick and small-diameter metallic pipe 11 provided at the end thereof with a connecting head portion 13 of a truncated arcuate shape having a spherical pressing seat surface 12 on its outer periphery formed by buckling molding. The high-pressure fuel injection pipe of this type is connected by loosely fitting a ring-shaped washer 15 or a sleeve washer (not shown) to a pipe diameter portion 14 of the thick and small-diameter metallic pipe 11 itself which constitutes an under-head portion of the connecting head portion 13, engaging in this state the back surface of the connecting head portion 13 to the bottom wall surface inside a tightening nut 16 assembled via the washer 15, being pressed against the seat surface of a pipe joint (not shown) of a holder on the partner side or a pump when screwing and tightening thereto.

DISCLOSURE OF INVENTION

However, in the high-pressure fuel injection pipe of this type, there is a problem in that concentration of a stress may occur due to a bending load or the like caused by vibrations of an under-head portion R of the connecting head portion 13 because of the structure of the pipe diameter portion 14 formed simply of the metallic pipe itself which corresponds to the portion in the vicinity of the under-head portion of the connecting head portion 13, and the loosely fitted structure at the pipe diameter portion 14 of the washer 15, whereby deterioration of mechanical strength and hence local fatigue are resulted, thereby generating cracking or bending damages easily.

In order to solve the problem described above, such counter measure that a fillet R provided at the under-head portion connecting a flange 13' of the connecting head portion 13 and the pipe diameter portion 14 is increased to alleviate the concentration of the stress has been employed in the related art. However, when the fillet R is increased in size, it is necessary to increase the diameter of the flange 13' consequently as well. The flange 13' is a portion for receiving a nut tightening force via the washer or the sleeve, and hence it requires a sufficient area. However, increasing the area of the flange 13' by increasing the diameter thereof may result in increase in fold crimp formed on the inner surface of the pipe at the time of buckling molding (molding of the terminal), and hence the strength against the internal pressure may be lowered. Therefore, the size of the flange 13' is limited, and hence the measure to increase the diameter of the flange 13' is not necessarily effective measure for alleviating concentration of the stress. Therefore, in order to avoid damages of the metallic pipe due to an excessive stress, it is necessary to take measures such as to clamp the intermediate portion of the injection pipe or to suppress vibrations of an engine itself.

In view of such problems of the related art as described above, it is an object of the present invention to provide a high-pressure fuel injection pipe in which concentration of a stress to the portion under the connecting head portion generated by a bending load or the like caused by vibrations can be effectively alleviated.

A high-pressure fuel injection pipe according to a first aspect of the present invention is the high-pressure fuel injection pipe having a thick and small-diameter metallic pipe and a connecting head portion integrally formed therewith, the connecting head portion being increased in diameter by buckling molding and formed with a pressing seat surface with respect to the seat surface of a pipe joint for the partner side on the outer periphery on the connecting side, wherein an under-head portion of the connecting head portion is formed with a thick wall portion which satisfies conditions from 1 to 3 below.

1. Radius of curvature $R_1$ of a portion A of the thick wall portion continuing to the connecting head portion=0.03 to 0.15 times the outer diameter of the pipe.

2. Radius of curvature $R_2$ of a portion B continuing from the portion A of the thick wall portion to a straight pipe portion=0.3 to 1.5 times the outer diameter of the pipe.

3. Maximum diametrical size w of the thick wall portion= 0.25 to 0.4 times a maximum diametrical projecting length w of the connecting head portion In the present invention, the high-pressure fuel injection pipe is formed of a carbon steel pipe for a high-pressure piping, a stainless steel pipe, or a composite pipe material thereof. Also, the connecting head portion of the high-pressure fuel injection pipe of the present invention is formed into a truncated arcuate shape having the spherical pressing seat surface on the outer periphery thereof. Dimensions of the thick and small-diameter metallic pipe are on the order of 4.5 mm–20 mm in pipe diameter, 1.0 mm to 5.0 mm in inner diameter.

A second aspect of the present invention is characterized in that the thick wall portion is formed of a tapered wall which satisfies conditions from 4 to 7 shown below.

4. Angle $\theta$ of the tapered wall extending backward and continuing to the straight pipe portion with respect to the centerline of the pipe=7 to 15 degrees.

5. Radius of curvature $R_1$ of the portion A of the tapered wall continuing to the connecting head portion=0.03 to 0.15 times the outer diameter of the pipe.

6. Radius of curvature $R_2$ of the portion B of the tapered wall continuing to the straight pipe portion=0.3 to 1.5 times the outer diameter of the pipe.

7. Maximum diametric size W of the tapered wall=0.25 to 0.4 times the maximum diametrical projecting length W of the connecting head portion.

In the present invention, the high-pressure fuel injection pipe is formed of the carbon steel pipe for the high-pressure piping, the stainless steel pipe, or the composite pipe material thereof. Also, the connecting head portion of the high-pressure fuel injection pipe of the present invention is formed into a truncated arcuate shape having the spherical pressing seat surface on the outer periphery thereof. Dimensions of the thick and small-diameter metallic pipe are on the order of 4.5 mm–20 mm in pipe diameter, 1.0 mm to 5.0 mm in inner diameter.

As described above, according to the present invention, since the high-pressure fuel injection pipe is provided with the thick wall portion or the tapered wall continuing to the straight pipe portion, which satisfies the adequate conditions, is provided at the under-head portion of the connecting head portion, concentration of a stress to the portion in the vicinity of the under-head portion can be alleviated and hence the mechanical strength can be improved, whereby cracking or bending damages due to a bending load or the like caused by vibrations can significantly be reduced or prevented, and hence a stable connection and durability can be maintained for a long time.

BEST MODE FOR CARRYING OUT THE INVENTION

Figure 1:
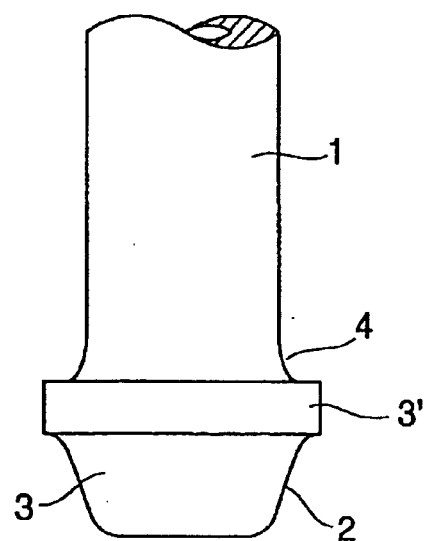
FIG. 1 is a plan view showing an embodiment of a high-pressure fuel injection pipe according to the present invention.

In the present invention, reference numeral 1 designates a thick and small-diameter metallic pipe, reference numeral 2 designates a pressing seat surface, reference numeral 3 designates a connecting head portion, reference numeral 3' designates a flange, reference numeral 4 designates a thick wall portion, reference numeral 14 designates a tapered wall, a portion A designates a range of a radius of curvature R1 continuing to the connecting head portion, a portion B designates a range of a radius of curvature R2 continuing to a straight pipe portion.

The thick and small-diameter metallic pipe 1 is formed of a carbon steel pipe for a high-pressure piping, a stainless steel pipe, or a composite pipe material thereof on the order of 4.5 mm–20 mm in pipe diameter and 1.0 mm–5.0 mm in inner diameter.

Figure 2:
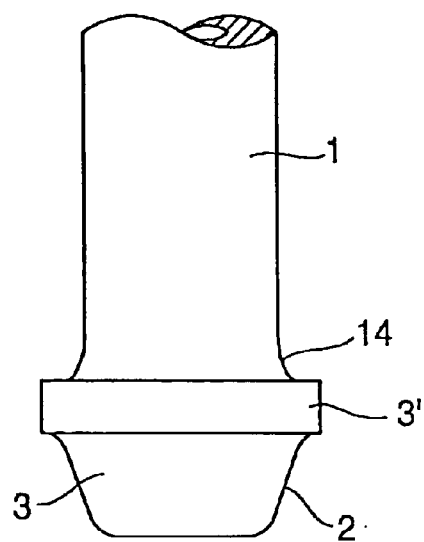
FIG. 2 is a plan view showing another embodiment of the high-pressure fuel injection pipe according to the present invention.
Figure 3:
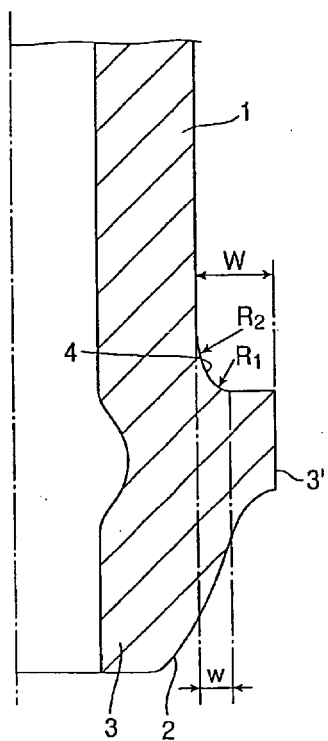
FIG. 3 is an enlarged view of a connecting head portion of the high-pressure fuel injection pipe shown in FIG. 1, in which (a) is a half cross-sectional view, and (b) is an enlarged view of a principal portion of (a)
Figure 3:
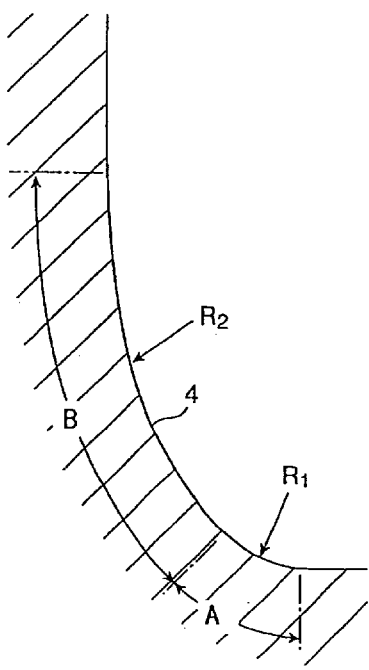
Figure 4:
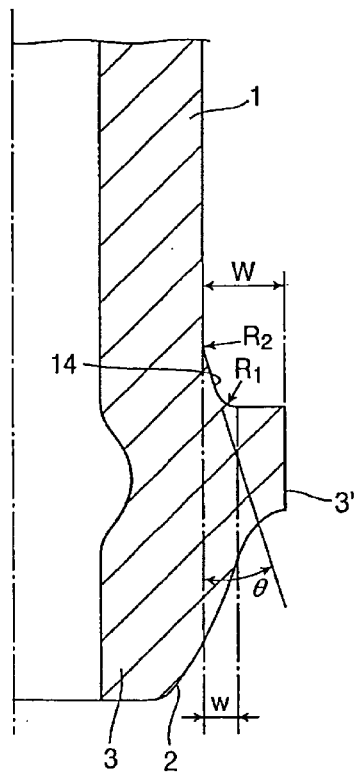
FIG. 4 is an enlarged view of the connecting head portion of the high-pressure fuel injection pipe shown in FIG. 2, in which (a) is a half cross-sectional view, and (b) is an enlarged view of a principal portion of (a)
Figure 4:
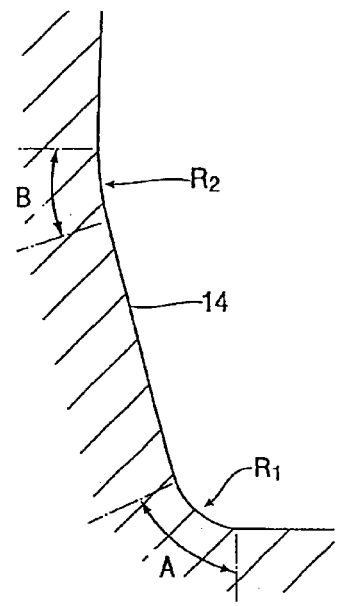

The high-pressure fuel injection pipe of the present invention shown in FIG. 1 and FIG. 2 is formed of the thick and small-diameter metallic pipe 1 provided with the truncated arcuate shaped connecting head portion 3 having the spherical pressing seat surface 2 on the outer peripheral surface at the end thereof and with the thick wall portion 4 or the tapered wall 14 extending rearward so as to continue to the straight pipe portion of the thick and small-diameter metallic pipe 1 at the under-head portion of the connecting head portion 3 formed via the portion A and the portion B by buckling molding.

A manufacturing method includes the steps of buckling molding the end of the thick and small-diameter metallic pipe in the form of a straight pipe cut into a predetermined length of the product by press process and forming the truncated arcuate shaped connecting head portion 3 having the pressing seat surface 2 with respect to the seat surface of the pipe joint portion (not shown) of an injection nozzle of the partner side or a pump, and the thick wall portion 4 or the tapered wall 14 extending rearward so as to continue to the straight pipe portion of the thick and small-diameter metallic pipe 1 together with R-portions of the portion A and the portion B at the under-head portion of the connecting head portion 3 on the outer peripheral surface on the connecting side.

The reason why the thick wall portion 4 is to satisfy the conditions from 1 to 3 as described above is as follows.

1. The reason why the radius of curvature R1 of the portion A continuing to the connecting head portion 3 of the thick wall portion is determined to be 0.03 to 0.15 times the outer diameter of the pipe is because the strength is deteriorated due to concentration of a stress if it is smaller than 0.03 times, and the effective contact areas of the flange 3' with respect to the washer and the sleeve come short if it exceeds 0.15 times.

2. The reason why the radius of curvature R2 of the portion B continuing to the straight pipe portion of the thick wall portion is determined to be 0.3 to 1.5 times the outer diameter of the pipe is because a sufficient effect for alleviating concentration of a stress cannot be obtained if it is smaller than 0.3 times, and the length of the thick wall portion 4 increases if it exceeds 1.5 times and hence constraint in bending process increases, which is not actual.

3. The reason why the maximum diametrical size w of the thick wall portion is determined to be 0.25 to 0.4 times a maximum diametrical projecting length W of the connecting head portion is because a sufficient effect of the thick wall portion 4 cannot be obtained if it is smaller than 0.25 and the effective contact areas of the flange 3' with respect to the washer and the sleeve come short if it exceeds 0.4 times.

Also, the reason why the tapered wall 14 is to satisfy the conditions from 4 to 7 as described above is as follows.

4. The reason why an angle θ of the tapered wall extending backward and continuing to the straight pipe portion with respect to the centerline of the pipe is determined to be 7 to 15 degrees is because concentration of a stress to the portion A of the tapered wall continuing to the connecting head portion 3 due to the bending load or the like occurs and hence the fatigue strength is lowered if it is smaller than 7 degrees, and similar concentration of a stress to the portion B of the tapered wall continuing to the straight pipe portion occurs and hence the fatigue strength is lowered if it exceeds 15 degrees.

5. The reason why the radius of curvature R1 of the portion A of the tapered wall continuing to the connecting head portion 3 is determined to be 0.03 to 0.15 times the outer diameter of the pipe is because the strength is lowered due to concentration of a stress if it is smaller than 0.03 times, and the effective contact areas of the flange 3' with respect to the washer and the sleeve come short if it exceeds 0.15 times.

6. The reason why the radius of curvature R2 of the portion B of the tapered wall continuing to the straight pipe portion is determined to be 0.3 to 1.5 times the outer diameter of the pipe is because a sufficient effect for alleviating concentration of a stress cannot be obtained if it is smaller than 0.3 times and the length of the tapered wall 14 increases if it exceeds 1.5 times and hence constraint in bending process increases, which is not actual.

7. The reason why the maximum diametric size W of the tapered wall is determined to be 0.25 to 0.4 times the maximum diametrical projecting length W of the connecting head portion 3 is because a sufficient effect of the tapered wall 14 cannot be obtained if it is smaller than 0.25 times and the effective contact areas of the flange 3' with respect to the washer and the sleeve come short if it exceeds 0.4 times.

EXAMPLES

Example 1

Figure 5:
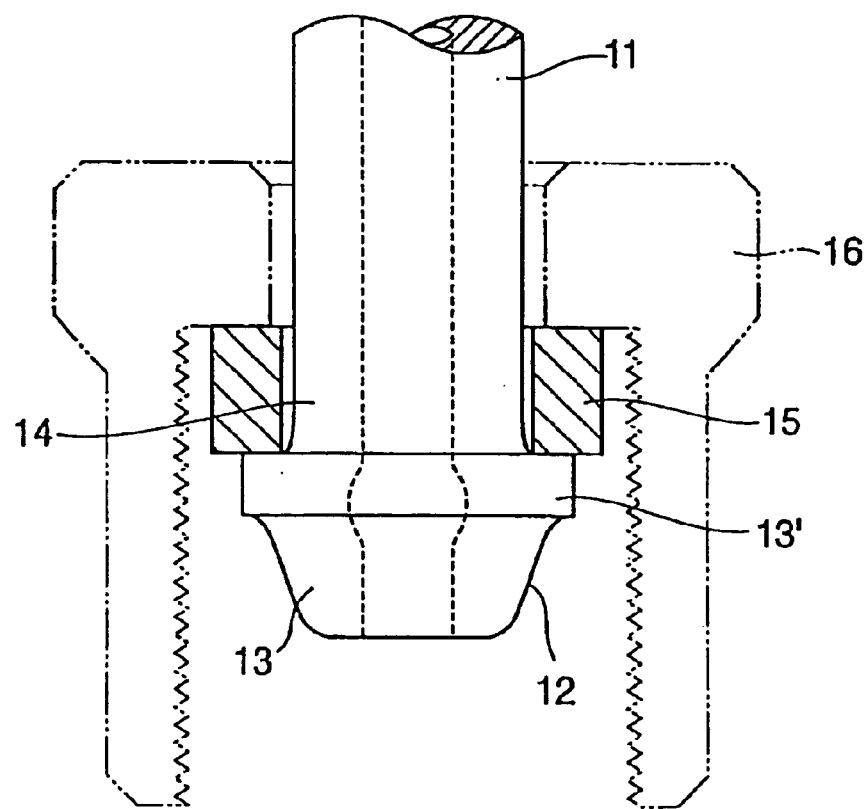
FIG. 5 is a plan view showing an example of the high-pressure fuel injection pipe in the related art.

The result of a fatigue characteristics test conducted for a high-pressure fuel injection pipe having a thick wall portion that satisfies the conditions in 1 to 3 described above and a high-pressure fuel injection pipe in the related art having a shape without the thick wall portion as shown in FIG. 5 using a thick and small-diameter metallic pipe of 3 mm in inner diameter and 6.35 mm in outer diameter formed of STS410 is shown in Table 1.

As is clear from the result shown in Table 1, in the high-pressure fuel injection pipe according to the present invention, concentration of a stress to an under-head portion of a connecting head portion was alleviated and hence the generated stress could be reduced in comparison with the pipe in the related art.

TABLE 1

| Test Piece No. | | Thick Wall Portion | | | Maximum Stress (MPa) |
|---|---|---|---|---|---|
| | | R1(mm) | R2(mm) | w(mm) | |
| Invention | 1 | 0.2 | 3 | 0.5 | 197 |
| | 2 | 0.3 | 3 | 0.5 | 203 |
| | 3 | 0.4 | 3 | 0.5 | 206 |
| | 4 | 0.4 | 4 | 0.5 | 207 |
| | 5 | 0.2 | 9.5 | 0.5 | 197 |
| | 6 | 1.0 | 3 | 1.45 | 149 |
| Comparative Example | | 0.4 | — | 0.4 | 252 |

Example 2

The result of the fatigue characteristic test conducted for a high-pressure fuel injection pipe having a thick wall portion that satisfies the conditions in 4 to 7 described above and a high-pressure fuel injection pipe in the related art having a shape without the kick wall portion as shown in FIG. 5 using a thick and small-diameter metallic pipe of 4 mm in inner diameter and 10 mm in outer diameter formed of STS 410 is shown in Table 2.

As is clear from the result shown in Table 2, the high-pressure fuel injection pipe according to the present invention in this example as well, concentration of a stress to the under-head portion of the connecting head portion was alleviated and hence the generated stress could be reduced in comparison with the pipe in the related art.

TABLE 2

| Test Piece No. | | Tapered Wall | | | | Maximum Stress (MPa) |
|---|---|---|---|---|---|---|
| | | θ(°) | R1 (mm) | R2 (mm) | w (mm) | |
| Invention | 1 | 7.5 | 0.3 | 1 | 0.5 | 228 |
| | 2 | 10 | 0.3 | 1 | 0.5 | 237 |
| | 3 | 15 | 0.3 | 1 | 0.5 | 203 |
| Comparative Example | 1 | 0 | 0.4 | — | 0.4 | 252 |
| | 2 | 4 | 0.3 | 1 | 0.5 | 240 |

INDUSTRIAL APPLICABILITY

As described above, according to the high-pressure fuel injection pipe of the present invention, since the thick wall portion or the tapered wall continuing to the straight pipe portion, which satisfies the adequate conditions, is provided at the under-head portion of the connecting head portion, concentration of a stress to the portion in the vicinity of the under-head portion can be alleviated and hence the mechanical strength can be improved. Therefore, a superior effect such that cracking or bending damages due to a bending load or the like caused by vibrations can be alleviated or prevented significantly, and hence a stable connection and durability can be maintained for a long time is achieved.

What is claimed is:

1. A high-pressure fuel injection pipe comprising a thick and small-diameter metallic pipe and a connecting head portion integrally formed at the end thereof, the connecting head portion being increased in diameter by buckling molding and formed with a pressing seat surface with respect to the seat surface of a pipe joint for the partner side on the outer periphery on the connecting side, wherein an under-head portion of the connecting head portion is formed with a thick wall portion which satisfies conditions of:

a radius of curvature R1 of a portion A of the thick wall portion continuing to the connecting head portion is 0.03 to 0.15 times the outer diameter of the pipe;

a radius of curvature R2 of a portion B continuing from the portion A of the thick wall portion to a straight pipe portion is 0.3 to 1.5 times the outer diameter of the pipe; and a maximum diametrical size w of the thick wall portion is 0.25 to 0.4 times the maximum diametrical projecting length W of the connecting head portion.

2. The high-pressure fuel injection pipe according to claim 1, wherein the high-pressure fuel injection pipe is formed of a carbon steel pipe for a high-pressure piping, a stainless steel pipe, or a composite pipe material thereof.

3. The high-pressure fuel injection pipe according to claim 1, wherein the connecting head portion is formed into a truncated arcuate shape having a spherical pressing seat surface on the outer periphery thereof.

4. The high-pressure fuel injection pipe according to claim 1, wherein the dimensions of the thick and small diameter metallic pipe are on the order of 4.5 mm–20 mm in pipe diameter, 1.0 mm to 5.0 mm in inner diameter.

5. A high-pressure fuel injection pipe comprising a thick and small-diameter metallic pipe and a connecting head portion integrally formed at the end thereof, the connecting head portion being increased in diameter by buckling molding and formed with a pressing seat surface with respect to the seat surface of a pipe joint for the partner side on the outer periphery on the connecting side, wherein the under-head portion of the connecting head portion is formed with a tapered wall which satisfies conditions of:

an angle θ of the tapered wall extending backward and continuing to a straight pipe portion with respect to the centerline of the pipe is 7 to 15 degrees;

a radius of curvature R1 of a portion A of the tapered wall continuing to the connecting head portion is 0.03 to 0.15 times the outer diameter of the pipe; and a radius of curvature R2 of a portion B of the tapered wall continuing to the straight pipe portion is 0.3 to 1.5 times the outer diameter of the pipe; and a maximum diametric size W of the tapered wall=0.25 to 0.4 times a maximum diametrical projecting length W of the connecting head portion.

6. The high-pressure fuel injection pipe according to claim 5, wherein the high-pressure fuel injection pipe is formed of the carbon steel pipe for the high-pressure piping, the stainless steel pipe, or the composite pipe material thereof.

7. The high-pressure fuel injection pipe according to claim 5, wherein the connecting head portion of the high pressure fuel injection pipe is formed into a truncated arcuate shape having the spherical pressing seat surface on the outer periphery thereof.

8. The high-pressure fuel injection pipe according to claim 5, wherein the dimensions of the thick and small diameter metallic pipe are on the order of 4.5 mm–20 mm in pipe diameter, 1.0 mm to 5.0 mm in inner diameter.

* * * * *